United States Patent
Rucker

Patent Number: 5,851,339
Date of Patent: Dec. 22, 1998

[54] METHOD OF MAKING A LAMINATED PRODUCT SUCH AS A MATTRESS AND FURNITURE INSULATOR PAD

[75] Inventor: John R. Rucker, Norwood, Pa.

[73] Assignee: Foamex L.P., Linwood, Pa.

[21] Appl. No.: 796,956

[22] Filed: Feb. 7, 1997

Related U.S. Application Data

[63] Continuation of Ser. No. 408,731, Mar. 22, 1995, abandoned.

[51] Int. Cl.⁶ .................................................... A32B 31/20
[52] U.S. Cl. .................. 156/290; 156/306.6; 156/309.3; 156/323; 156/324
[58] Field of Search ..................... 156/324, 290, 156/179, 306.6, 555, 82, 323, 289, 309.3

[56] References Cited

U.S. PATENT DOCUMENTS

| | | | |
|---|---|---|---|
| 2,957,793 | 10/1960 | Dickey | 156/324 |
| 2,999,041 | 9/1961 | Lapalla | 428/316.6 |
| 3,172,072 | 3/1965 | Willy | 264/46.3 |
| 3,562,085 | 2/1971 | Crandal | 156/324 |
| 3,741,854 | 6/1973 | DeGoria | 156/324 |
| 3,767,500 | 10/1973 | Tally | 156/324 |
| 3,923,293 | 12/1975 | Wiegand | |
| 4,129,672 | 12/1978 | Momura | 156/322 |
| 4,248,650 | 2/1981 | Murro | 156/323 |
| 4,418,106 | 11/1983 | Landler | 156/78 |
| 4,758,299 | 7/1988 | Burke | 156/313 |
| 5,211,792 | 5/1993 | Cartes | 156/306.6 |

*Primary Examiner*—Daniel Stemmer
*Attorney, Agent, or Firm*—Connolly & Hutz

[57] ABSTRACT

The present invention relates to a method of making a laminated product, such as an insulator pad comprised of foam and stiffening layers held together with adhesive. A thin protective barrier foam sheet is placed between the surface of a compression roller and the sheets to be laminated together by passing them between compression rollers. The thin protective barrier foam sheet may or may not form the outer layer of the laminated product and prevents adhesive and foam material from contaminating the surface of the roller.

15 Claims, 3 Drawing Sheets

METHOD OF MAKING A LAMINATED PRODUCT SUCH AS A MATTRESS AND FURNITURE INSULATOR PAD

This application is a continuation of U.S. Ser. No. 08/408,731, filed Mar. 22, 1995 now abandoned. An additional related application is U.S. Ser. No. 08/408,349 filed Mar. 22, 1995, related to a mattress and furniture insulator pad structure.

BACKGROUND OF THE INVENTION

The present invention relates to separating barriers or insulator pads used with mattresses and upholstered furniture with spring support, including cushions and chair seats installed in motor vehicles and airplanes, and methods for making such barriers or pads.

Spring support systems, such as coil springs provided in mattresses and chair seats, usually are separated from the cushioning material or top furniture or mattress surface. The separating barrier or insulator performs several functions. First, it protects the cushion from the sharp tips of the wire springs. Without a separating barrier or insulator, the edges of the wire springs could puncture the cushioning material, damaging the cushion and in time possibly protruding from the surface of the cushion to poke or scratch the individual who sits or reclines upon the cushion. Second, it forms a bridge between the individual springs so that the load on the cushion is more evenly distributed across the springs. Without a separating barrier or insulator, the coil springs would act upon the cushioning material individually, eventually making the surface of the cushion feel bumpy and uncomfortable to the individual who sits or reclines upon the cushion (sometimes called "telegraphing"). Third, it adds some cushioning, albeit to a lesser degree when compared to the furniture cushion that is placed on top of the insulator pad.

At present, separating barriers or insulator pads are placed between the tops of the springs and the cushions or mattress pad tops. Such barriers or pads are usually formed from an inexpensive fibrous pad material, such as "shoddy," a layered sheet material composed primarily of textile scraps that are needle-punched, or, in some cases, compressed together with resin or glue. Shoddy is manufactured by a number of companies, including Jamesville Products Company and Chris Craft Company. Resinated shoddies that have increased stiffness and resist bending are often selected for insulator pads.

Using shoddies or resinated shoddies for the barrier or insulator pads has significant disadvantages. Because shoddy is formed from textile scraps, the product characteristics vary from lot to lot. The weight and thickness of the sheet of shoddy may vary even within the same lot. Such product variations cause significant performance variations. Moreover, the resins used to form the shoddy will break down or deteriorate and lose stiffness over time. After only a short time in use, the shoddy will begin to reduce its stiffness and lose its insulating properties. If the insulating pad breaks down, the cushion will have an uncomfortable, lumpy feel because the load atop the cushion is not evenly distributed over the springs.

An object of the present invention is to provide a barrier or insulator pad that has substantially uniform physical properties, with good isolation characteristics, load distribution capabilities and offers some degree of cushioning.

A further object of the invention is to provide a method of laminating together a porous sheet to another sheet without fouling the compression rollers with adhesive. Such method is suitable for making barriers or insulator pads according to the present invention.

One known method for forming a laminated product is to treat one surface of a sheet with an adhesive and pass that sheet with one or more additional sheets between compression rollers, to compress together the sheet surfaces to which adhesive has been applied. When one of the sheets to be laminated is a porous material, adhesive may penetrate through the sheet and adhere and contaminate one or more compression roller surfaces. In addition, portions of the laminated sheets may stick to the fouled compression roller surface and result in defective product and the compression rollers must be cleaned more frequently to prevent substantial build-up.

SUMMARY OF THE INVENTION

A mattress and furniture barrier or insulator pad according to the present invention has a core foam sheet, preferably polyurethane foam, most preferably polyether, polyurethane foam, sandwiched between first and second stiffening layers. The core foam sheet may also be formed of rebonded polyurethane foam. Both the first and second stiffening layers are formed preferably of polypropylene. In a preferred embodiment of the invention, the stiffening layers comprise openmesh polypropylene netting.

The stiffening layers may be attached to the foam sheet with a hot melt adhesive film, or a pressure sensitive adhesive, or by flame lamination. With all of these methods, a protective foam layer sheet separate from the foam sheet that forms the core of the insulator pad is placed between at least one roller surface and the stiffening layer sheet to prevent the roller from being contaminated with adhesive or depolymerized foam. To attach a stiffening layer using a hot melt adhesive film, the core foam sheet, a sheet of hot melt film adhesive, a stiffening layer sheet and a protective foam layer sheet are positioned adjacent one another in the stated order and passed between compression rollers. At least the roller in contact with the protective foam layer is heated and the heat from such roller softens and activates the hot melt adhesive.

To attach using a pressure sensitive adhesive, a layer of such adhesive is sprayed or otherwise applied to one surface of the core foam sheet, and the core foam sheet with the adhesive exposed, a stiffening layer sheet and a protective foam layer sheet are positioned adjacent one another in the stated order and passed between compression rollers. The compression forces applied to the sheets by the rollers cause the stiffening layer sheet to adhere to the core foam sheet.

To attach using flame lamination, a core foam sheet, a stiffening layer sheet and a protective foam layer sheet are again passed between compression rollers. However, before coming in contact with the rollers or the other sheets in the laminate product, one surface of the core foam sheet is exposed to heat or flame to soften or depolymerize the foam surface, creating a tacky or sticky surface. When thereafter compressed between the rollers, the stiffening layer adheres to the tacky core foam sheet surface. As the core foam sheet cools, the depolymerized surface repolymerizes and holds or bonds the stiffening layer in place.

The insulator pads so formed are placed between the coil springs and cushions of mattresses or furniture during manufacture, replacing the fiber pad or shoddy presently used. The stiffening layers in combination with the foam sheet core provide the bridging effect needed to prevent the furniture springs from "telegraphing" into the furniture cushion and provide desired additional cushioning. The materials for the core foam sheet and stiffening layers may be selected so that the insulator pad has consistent properties, such as stiffness and durability.

In a particularly preferred embodiment of the invention, the insulator pad comprises up to seven components resulting a final product of five layers: a thin foam top layer, a first stiffening layer, a core foam sheet center section, a second stiffening layer, and a thin foam bottom layer. The stiffening layers again sandwich the core foam sheet center layer and are attached to the foam sheet, preferably with hot melt film adhesive and heated compression rollers. The thin foam top and bottom layers are attached to the outer surfaces of the core foam center section by the hot melt film adhesive. The thin foam top and bottom layers are especially preferred when the stiffening layers are formed from openmesh netting, most preferably polypropylene or polyethylene netting. After the adhesive has been applied to the surfaces of the foam sheet or the hot melt film placed adjacent to the surfaces of the foam sheet, the layers are normally passed between compression rollers, preferably heated compression rollers.

The protective thin foam top and bottom layers prevent excess adhesive from contacting and building up on the compression rollers. Once the insulator pad is formed and inserted between furniture springs and furniture cushions, the thin foam layers cover the stiffening layers and provide increased friction to prevent the insulator pad from slipping or moving once installed.

A method of applying a stiffening layer to a core foam sheet includes the steps of applying adhesive to a surface of the core foam sheet, positioning one surface of a stiffening layer adjacent to the surface of the foam sheet that has the adhesive applied, placing a thin foam sheet adjacent to another surface of the stiffening layer, and passing the core foam sheet, stiffening layer and thin protective foam sheet between a pair of compression rollers so that the one surface of the stiffening layer adheres to the surface of the core foam sheet to which adhesive has been applied. If flame lamination is used rather than an adhesive, the surface of the core foam sheet is first softened or depolymerized before it is positioned adjacent to one surface of a the stiffening layer. Whether using adhesive or flame lamination, the layers are passed between compression rollers and the thin foam sheet provides a protective barrier between the compression roller and the stiffening layer that prevents adhesive from contacting or building up on the roller. Preferably, the stiffening layer has holes or gaps so that portions of the surface of the thin foam sheet will adhere to portions of the foam sheet surface to which adhesive was applied exposed through the gaps or holes in the stiffening layer. Most preferably, the stiffening layer will be formed of an openmesh netting material, such as a polypropylene or polyethylene netting, so that a greater amount of the core foam sheet surface with applied adhesive will be exposed through the gaps or holes in the mesh.

The particularly preferred method for applying the stiffening layer to the core foam sheet is to apply a hot melt film adhesive between the core foam sheet and the stiffening layer with a protective thin foam sheet adjacent to the stiffening layer forming a barrier between the stiffening layer and the surface of the compression roller when the sheets and layers to be laminated are passed between compression rollers. At least one of the compression rollers is heated. Most preferably, the hot melt adhesive film is applied to, or placed adjacent to, both the top and bottom surfaces of the foam sheet and stiffening layers are applied to both surfaces of the core sheet. In such a case, both of the compression rollers should be heated if the stiffening layers are to adhere to the foam sheet with only one pass through the compression rollers.

DESCRIPTION OF THE PREFERRED EMBODIMENTS

Figure 1:
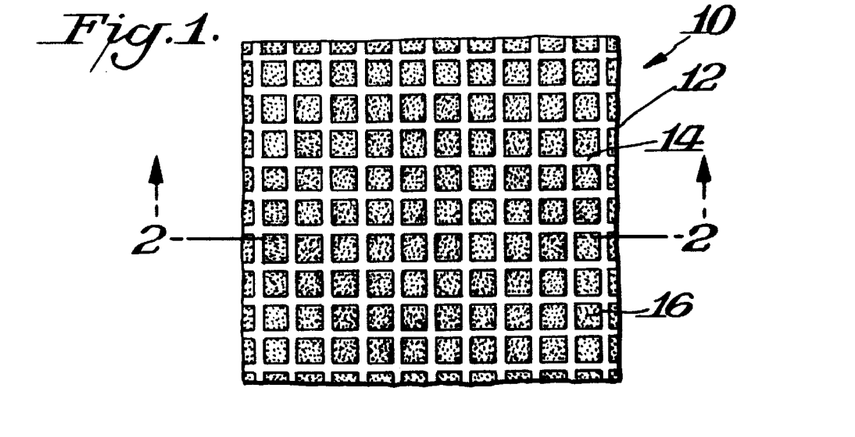
FIG. 1 is a top plan view of an insulator pad of the present invention.
Figure 2:
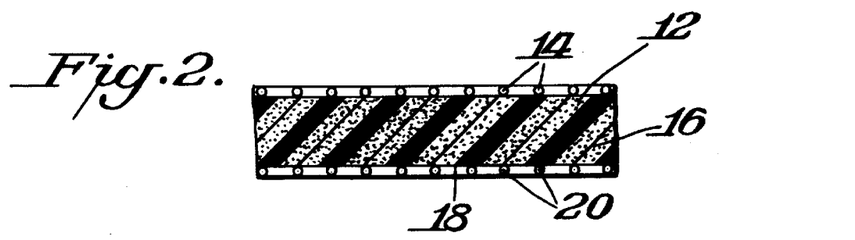
FIG. 2 is a cross sectional view of the insulator pad taken along line 2—2 of FIG. 1.

Referring to FIGS. 1 and 2, a portion of an insulator pad 10 according to the invention is shown. The insulator pad 10 has an identical top and bottom plan view. The top surface 12 comprises a stiffening layer 14 attached to a core foam center sheet 16. As shown in FIG. 2, the bottom surface 18 of the pad 10 similarly comprises a stiffening layer 20 attached to the core foam center sheet 16.

The core foam center sheet 16 preferably is formed of polyurethane foam, most preferably polyether, polyurethane foam having a foam density of from about 0.6 to about 6.0 lbs/ft$^3$. A rebonded polyurethane foam with a foam density in the range of about 3 to about 10 lbs/ft$^3$ is also suitable. Rebonded polyurethane foam is a composite formed from scraps of polyurethane foam compressed together with a resin or adhesive. The core foam center sheet 16 should have a thickness in the range of from about ⅛ to about 1.0 inches, preferably from about ¼ to ½ inches. In a preferred embodiment of the present invention, the foam also has an IFD$_{25}$ of from about 10 to 200. The IFD of a foam is measured by the Indentation Force Deflection Test and the "IFD$_{25}$" numbers indicated above are "rest" values. That is, the force needed to compress the foam sample 25% of its initial thickness after being held in that position for one minute. The loading platen that is used in the test has a circular area of 50 in$^2$.

The stiffening layers 14, 20 may be any material with stiffness that will offer dimensional stability to the insulator pad, such as hemp, polyester, polypropylene, or polyethylene, but preferably are formed of polypropylene. Most preferably, the stiffening layers 14, 20 are polypropylene that has been formed into an openmesh netting. One suitable polypropylene netting is No. 6155 from Maynard Plastics of Salem, Mass., a division of Applied Extrusion Technologies, Inc. No. 6155 is a polypropylene netting with 6.4 pounds of material per 1000 square feet and has a weave grid with ¼ inch squares.

The stiffening layers 14, 20 may be attached to the core foam center sheet 16 with an adhesive, such as a contact adhesive that contains about 18% vinyl acetate. Once the adhesive has been applied to the surfaces of the foam center sheet 16, the stiffening layers 14, 20 are positioned adjacent to the adhesive-coated surfaces on the foam sheet 16 and the layers 14, 20 and sheet 16 are together passed between compression rollers.

The stiffening layers 14, 20 might also be attached to the core foam center sheet 16 by flame laminating (i.e., by heating either the top or bottom, or both, surfaces of the foam center sheet to depolymerize and soften the surface 16 and then contacting the tacky softened surface(s) with the material to be laminated while pressure is applied).

Preferably, the stiffening layers 14, 20 are attached to the foam center sheet 16 with a hot melt film adhesive, such as a polyethylene polyacrylic acid copolymer.

After the stiffening layers 14, 20 are applied to the foam center sheet 16, the layered material so formed may be cut to any desired shape and installed between the springs and cushions of an article of furniture, such as a chair. The insulator pad 10 may also be installed between the springs and cushioning material of a mattress. The insulator pad 10 of the invention may also be installed in motor vehicle seats, such as automobiles, trucks and vans.

Figure 3:
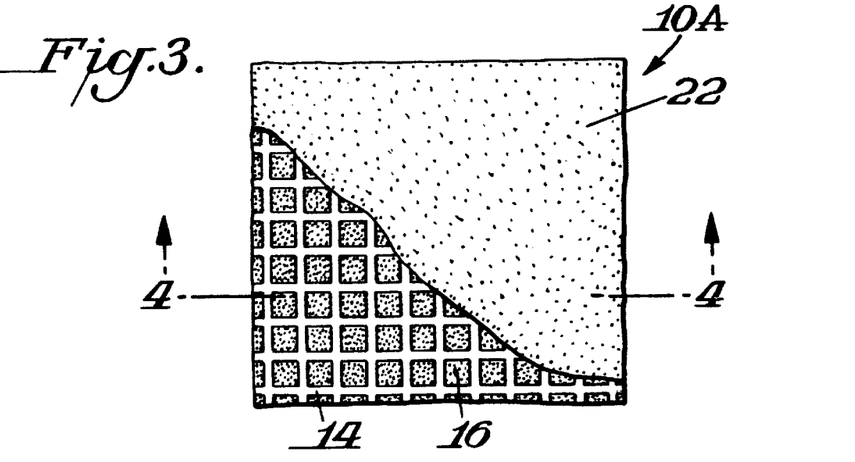
FIG. 3 is a top plan view of an alternate embodiment of the insulator pad of the present invention that has additional thin outer layers of foam.
Figure 4:
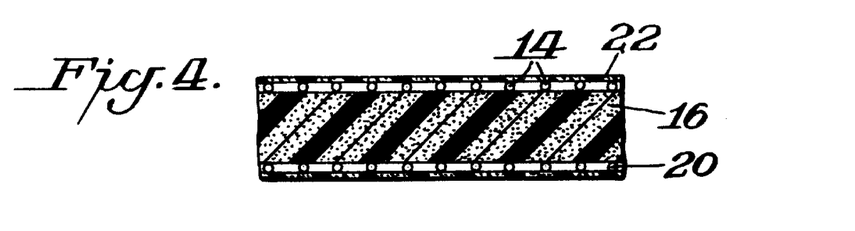
FIG. 4 is a cross sectional view taken along line 4—4 of FIG. 3 of the alternate embodiment of the insulator pad.
Figure 5:
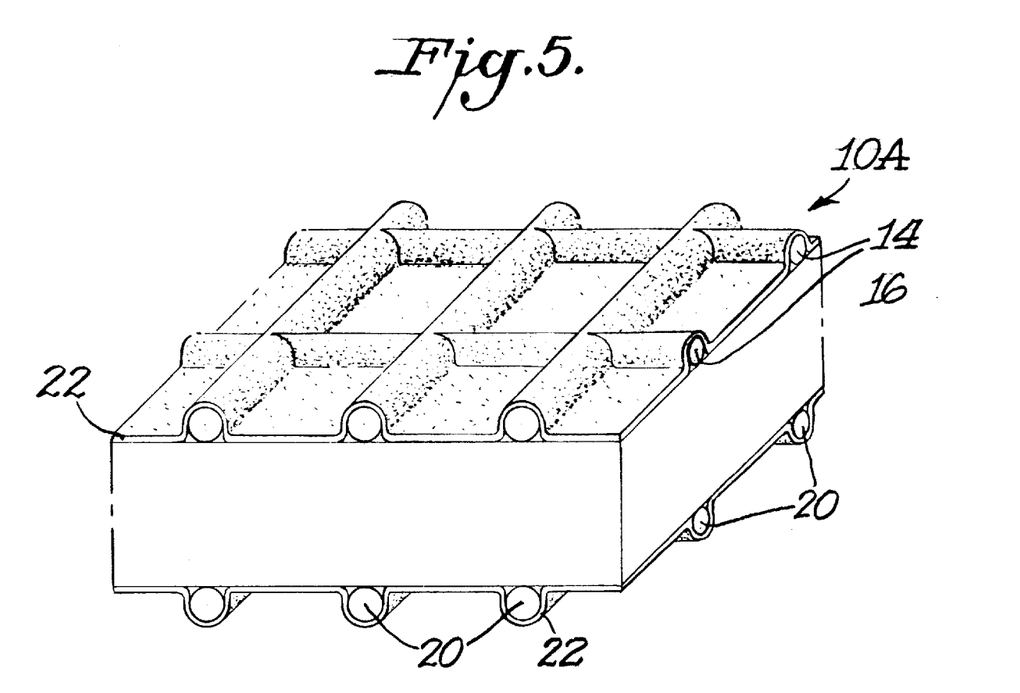
FIG. 5 is an enlarged perspective view showing a fragment of the alternate embodiment insulator pad of the present invention.
Figure 6:
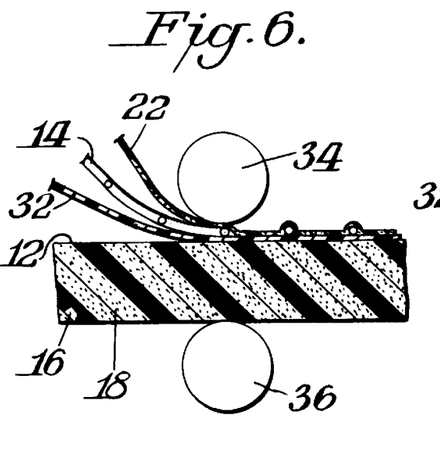
FIG. 6 is a diagrammatic view in side elevation of a first method for manufacturing a laminated product, such as an insulator pad.

Referring now to FIGS. 3–5, in a preferred embodiment of the invention, the insulator pad 10A is formed from seven components and results in a pad with five layers. FIGS. 3 and 4 show the overlay of the five layers: a thin foam sheet 22, a stiffening layer 14, a core foam center sheet 16, a stiffening layer 20 and another thin foam sheet 22. The other two "components" are the adhesive applied to the upper and lower surface of the core foam center sheet. Although it is noted that certain methods for applying the layers, such as flame lamination, eliminate the need for separate adhesive. As in the other embodiment shown in FIGS. 1 and 2, the core foam center sheet 16 is sandwiched between two stiffening layers 14, 20. In addition, the pad 10A is provided with thin foam sheets 22 that are laid adjacent the stiffening layers 14, 20 and form the outer layers of the pad. The thin foam sheets 22 preferably are formed from polyurethane foam, most preferably polyether polyurethane foam. The sheets 22 preferably have a thickness of about 1/32 inches.

FIG. 5 illustrates the finished insulator pad 10A as assembled. The thin foam sheets 22 and the stiffening layers 14, 20 are attached by adhesive to the surfaces of the core foam sheet.

Referring now to FIGS. 6–9, the insulator pad 10A is formed preferably by one of the following methods. According to the method shown in FIG. 6, a hot melt adhesive film 32 is positioned adjacent or applied to the top surface 12 of the core foam center sheet 16. Next, the stiffening layer 14 is positioned adjacent to the hot melt adhesive film 32, and a thin foam sheet 22 is positioned adjacent to the stiffening layer. A suitable hot melt film adhesive for this purpose is a polyethylene polyacrylic acid copolymer, such as Dow Chemical No. 916. The foam center sheet 16, adhesive 32, stiffening layer 14, and thin foam sheet 22 are then passed between compression rollers 34, 36, with the heated roller 34 closest to the thin foam sheet 22. The heat from the heated roller 34 activates the hot melt film adhesive 32, thus bonding together the stiffening layer 14 and foam center sheet 16. Preferably, the stiffening layer 14 will have holes or gaps through which portions of the adhesive 32 will be exposed. In such a case, portions of the surface of the thin foam sheets 22 will adhere to the exposed adhesive-coated portions of the surface of the core foam center sheet 16, forming the layered insulator pad 10. The thin foam sheet 22 prevents the heated compression roller 34 from contacting the stiffening layer 14 and any exposed adhesive 32. The thin foam sheet 22 thus prevents damage to the roller 34 from the build up of excess adhesive. Layered insulator pad 10A may be formed with the apparatus shown in FIG. 6 if additional adhesive, an additional stiffening layer and an additional thin foam protective sheet are placed adjacent the other or bottom surface 18 of the foam center sheet 16 and the material is inverted and passed again through the compression rollers 34, 36.

Figure 7:
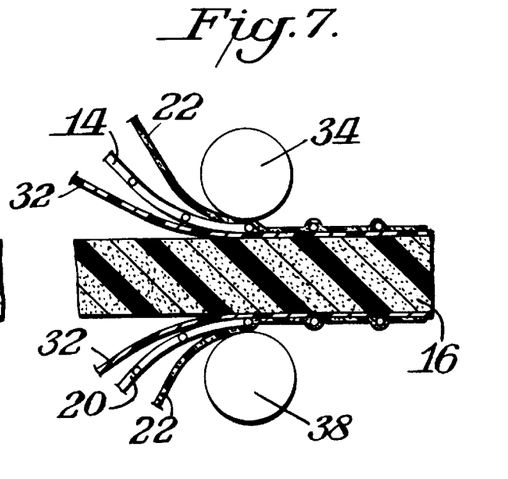
FIG. 7 is a diagrammatic view in side elevation of a second method for manufacturing a laminated product such as an insulator pad.

The layered insulator pad 10A may be formed with only a single pass between compression rollers if the compression rollers are both heated as shown in FIG. 7. In such embodiment, a layer of hot melt film adhesive 32 is placed adjacent both the top and bottom surfaces of the core foam center sheet 16, stiffening layers 14, 20 are placed adjacent such adhesive 32, and protective thin foam sheets 22 are placed adjacent the stiffening layers 14, 20. The core foam center sheet 16 with the other layers in the stated order is passed between two heated compression rollers 34, 38 to activate the adhesive and bond the stiffening layers 14, 20 to the core foam center sheet 16. Preferably, the thin foam sheets 22 will bond to the core foam center sheet 16 where the adhesive 32 penetrates through gaps or holes or pores in the stiffening layers 14, 20. Even if the thin foam sheets 22 do not adhere, they will still provide a protective barrier that prevents the build up of foam or adhesive on the compression rollers 34, 38.

Figures 8, 9:
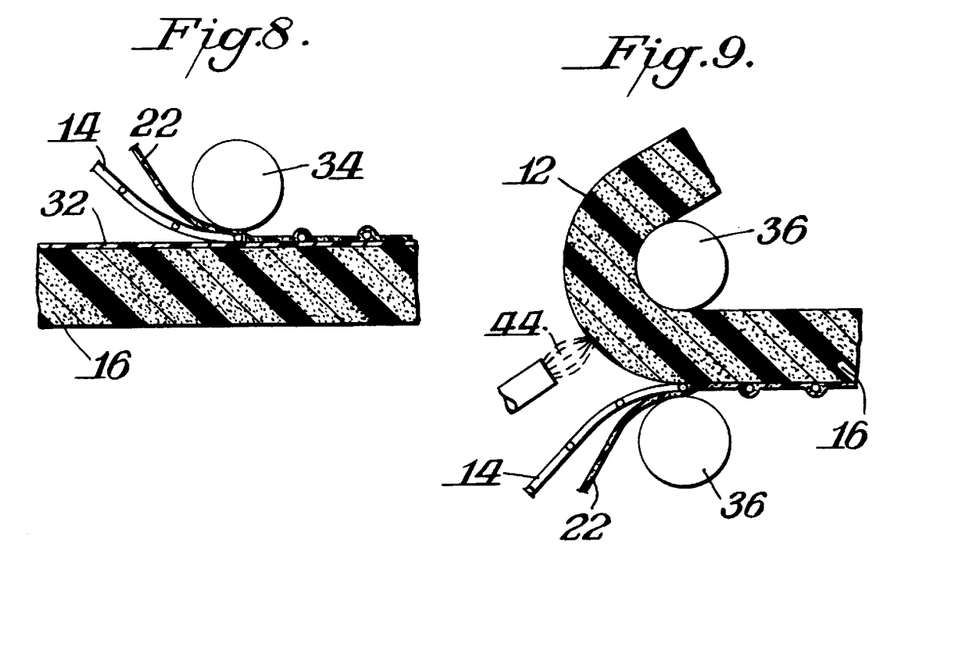
FIG. 8 is a diagrammatic view in side elevation of a third method for manufacturing a laminated product such as an insulator pad.
FIG. 9 is a diagrammatic view in side elevation of a fourth method for manufacturing a laminated product such as an insulator pad.

In an alternate method for attaching the stiffening layer 14 to the foam center sheet 16, as shown in FIG. 8, an adhesive may be applied to the top surface 12 of the foam center sheet 16. The adhesive may be a pressure sensitive contact adhesive, such as an acrylic adhesive UP304 offered by Coating Sciences, Inc. of Bloomfield, Conn., or a hot melt film adhesive. The adhesive-coated foam center sheet 16, stiffening layer 14 and thin foam sheet 22 are then passed on a conveyor under a compression roller 34. The compression roller 34 is heated where a hot melt film adhesive is used.

Flame lamination is a further alternate method for attaching the stiffening layer 14 to the core foam center sheet 16. As shown in FIG. 9, the top surface 12 of the foam center sheet 16 is heated by flame 44 or other heat source to depolymerize and soften the foam center sheet surface. The depolymerized foam surface is tacky or sticky. While the surface is in such tacky or sticky state, a stiffening layer 14 is placed adjacent to it, and the core foam center sheet 16 and stiffening layer 14 are forced between compression rollers 36. Preferably, a thin foam sheet 22 is placed adjacent to the stiffening layer 14 and provides a protective barrier between the surface of the compression roller 36 and the stiffening layer 14 and the tacky surface of the core foam center sheet 16.

Example According to the Invention

A suitable formulation to form the core foam center sheet 16 was produced by the following process. A polyol mixture was prepared from 35 parts of a polyether polyol (Voranol 3010-Dow) and 65 parts of a copolymer polyol (Voranol 3943-Dow). The polyol mixture (100 total parts) was reacted with 33.1 parts of TDI (toluene diisocyanate), 2.3 parts water, 0.12 parts tin catalyst (i.e., stannous octoate catalyst C-2 from Witco Corp.), 0.4 parts amine catalyst (C124—Niax A-1, a proprietary tertiary amine product of Air Products, in dipropylene glycol in a ratio of 1:6), and 0.8 parts of a silicone surfactant (L620 from Osi—a copolymer of polyether and polysiloxane). The isocyanate index was about 115 (i.e., a 15% excess of isocyanate over the stoichiometric amount).

All of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 2.5 lbs/ft$^3$ and an IFD$_{25}$ of about 70 to 120.

A suitable formulation to form the thin foam sheets 22 was produced by the following process. 100 parts of a polyether polyol (Voranol 3010-Dow) was reacted with 58.1 parts of TDI (toluene diisocyanate), 4.7 parts water, 1.0 part silicone surfactant (L6202 from Osi—a copolymer of polyether and polysiloxane), 1.2 parts tin catalyst (i.e., stannous octoate catalyst C-9 from Witco Corp.), 0.1 parts amine catalyst (C 124—Niax A-1, a proprietary tertiary amine product of Air Products, in dipropylene glycol in a ratio of 1:6), and 1.0 part amine catalyst (NEM—N-ethylmorpholine). The isocyanate index was about 104 (i.e., a 4% excess of isocyanate over the stoichiometric amount). As with the core foam center sheet foam formulation, all of the above ingredients were combined in a mixing chamber and agitated at high speed to form a reactive mixture. This reactive, foam-forming mixture was then discharged or dispensed from the mixing chamber onto a moving casting conveyor and allowed to rise and cure into the final foam product at ambient temperature and pressure. The resulting polyurethane foam had a density of about 1.5 lbs/ft$^3$ and an IFD$_{25}$ of about 30–50, preferably about 40.

A hot roll laminator having a nip roll speed of 10 feet per minute was set to have a gap between the heated roll and the rubber compression roll of 0.2 inches. The hot roll had a surface temperature of 485 [degrees F.]. The material to be laminated together to form the insulator pad was passed between the rolls of the laminator. The material was layered in the following manner prior to reaching the roller: core foam center sheet of polyether polyurethane foam with a density of 2.5 lbs/ft$^3$, an IFD$_{25}$ of 100 and a thickness of 0.437 inches, hot melt adhesive (Dow 916), a stiffening layer (openmesh netting Maynard 6155) and thin foam layer formed of polyether polyurethane foam with a density of 1.5 lbs/ft$^3$, an IFD$_{25}$ of 40 and a thickness of 0.032 inches. The thin foam layer was closest to the surface of the hot roller. Once the layers were laminated to the top surface of the core foam center sheet, the sheet was turned over for a second pass through the laminator rollers to laminate a second stiffening layer and a second thin foam layer to the bottom surface of the foam center sheet.

While the invention has been particularly shown and described with reference to preferred embodiments thereof, it will be understood by those skilled in the art that various changes in form and details may be made without departing from the spirit and scope of the invention as defined in the appended claims.

I claim:

1. A continuous method of preventing contamination of the surfaces of a pair of compression rollers when first and second stiffening layers and a core foam sheet are compressed between the pair of compression rollers, comprising:

applying an adhesive coating directly to an upper surface of the core foam sheet;

applying an adhesive coating directly to a lower surface of the core foam sheet;

passing the core foam sheet coated with adhesive and the first and second stiffening layers between the pair of compression rollers with a first surface of the first stiffening layer adjacent to the adhesive coating that is on the upper surface of the core foam sheet, and with a first surface of the second stiffening layer adjacent to the adhesive coating that is on the lower surface of the core foam sheet;

placing a second foam sheet having a top surface and a bottom surface formed from open-celled polyurethane foam with a thickness of about ⅟32 inch between one of the compression rollers and a second surface of the first stiffening layer;

placing a third foam sheet having a top surface and a bottom surface formed from open-celled polyurethane foam with a thickness of about ⅟32 inch between the other compression roller and a second surface of the second stiffening layer;

so that when the core foam sheet coated with adhesive on its upper and lower surfaces, the first stiffening layer, the second stiffening layer, the second foam sheet, and the third foam sheet pass between the pair of compression rollers, the first surface of the first stiffening layer adheres to the upper surface of the core foam sheet, the top surface of the second foam sheet contacts one of the compression rollers, the first surface of the second stiffening layer adheres to the lower surface of the core foam sheet, and no adhesive contacts the surfaces of the compression rollers.

2. The method of claim 1, wherein the first and second stiffening layers each have at least one gap or hole through their respective thicknesses, so that when the core foam sheet coated with adhesive on its upper and lower surfaces, the first stiffening layer, the second stiffening layer, the second foam sheet, and the third foam sheet pass between the pair of compression rollers, a portion of the bottom surface of the second foam sheet adheres to a portion of the upper surface of the core foam sheet at a contact point through at least one gap or hole in the first stiffening layer, and a portion of the bottom surface of the third foam sheet adheres to a portion of the lower surface of the core foam sheet at a contact point through at least one gap or hole in the second stiffening layer.

3. The method of claim 2, wherein the first and second stiffening layers are formed from openmesh netting.

4. A continuous method of preventing contamination of the surfaces of a pair of compression rollers when first and second stiffening layers and a core foam sheet are compressed between the pair of compression rollers, comprising:

placing a hot melt film adhesive on or adjacent to an upper surface of the core foam sheet;

placing a hot melt film adhesive on or adjacent to a lower surface of the core foam sheet;

placing a first surface of the first stiffening layer adjacent to the hot melt film adhesive that is on or adjacent to the upper surface of the core foam sheet;

placing a first surface of the second stiffening layer adjacent to the hot melt film adhesive that is on or adjacent to the lower surface of the core foam sheet, passing the core foam sheet, the hot melt adhesive films, and the stiffening layers between the pair of compression rollers;

placing a second foam sheet having a top surface and a bottom surface formed from open-celled polyurethane foam with a thickness of about 1/32 inch between one of the compression rollers and a second surface of the first stiffening layer;

placing a third foam sheet having a top surface and a bottom surface formed from open-celled polyurethane foam with a thickness of about 1/32 inch between the other compression roller and a second surface of the second stiffening layer; and applying heat to activate the hot melt film adhesive while the sheets, stiffening layers and adhesive films are between the rollers so that when the core foam sheet, the adhesive, the stiffening layers and the second and third foam sheets pass between the pair of compression rollers, the first surface of the first stiffening layer adheres to the upper surface of the core foam sheet, the first surface of the second stiffening layer adheres to the lower surface of the core foam sheet, the top surface of the second foam sheet contacts one of the compression rollers, and no adhesive contacts the surfaces of the compression rollers.

5. The method of claim 4, wherein the first stiffening layer has at least one gap or hole through its thickness and wherein the second stiffening layer has at least one gap or hole through its thickness so that when heat is applied to activate the adhesive and the core foam sheet, the adhesive, the stiffening layers and the second and third foam sheets pass between the pair of compression rollers, a portion of the bottom surface of the second foam sheet adheres to a portion of the upper surface of the core foam sheet at a contact point through at least one gap or hole in the first stiffening layer, and a portion of the bottom surface of the third foam sheet adheres to a portion of the lower surface of the core foam sheet at a contact point through at least one gap or hole in the second stiffening layer.

6. The method of claim 5, wherein the first and second stiffening layers are formed from openmesh netting.

7. A continuous method of preventing contamination of the surfaces of compression rollers when first and second stiffening layers and a core foam sheet are compressed between a pair of compression rollers, comprising:

depolymerizing an upper surface of the core foam sheet;

depolymerizing a lower surface of the core foam sheet;

passing the core foam sheet with depolymerized upper and lower surfaces and the first and second stiffening layers between the pair of compression rollers with a first surface of the first stiffening layer adjacent to the depolymerized upper surface of the core foam sheet, and with a first surface of the second stiffening layer adjacent to the depolymerized lower surface of the core foam sheet;

placing a second foam sheet having a top surface and a bottom surface formed from open-celled polyurethane foam with a thickness of about 1/32 inch between one of the compression rollers and a second surface of the first stiffening layer, and placing a third foam sheet having a top surface and a bottom surface formed from open-celled polyurethane foam with a thickness of about 1/32 inch between the other compression roller and a second surface of the second stiffening layer so that when the core foam sheet, the top surface of the second foam sheet contacts one of the compression rollers, the first and second stiffening layers and the second and third foam sheets pass between the compression rollers, the first surface of the first stiffening layer adheres to the upper surface of the core foam sheet, and the first surface of the second stiffening layer adheres to the lower surface of the core foam sheet.

8. The method of claim 7, wherein the first and second stiffening layers each have at least one gap or hole through their thickness, so that when the core foam sheet, the first and second stiffening layers and the second and third foam sheets pass between the compression rollers, portions of the bottom surface of the second foam sheet adhere to portions of the upper surface of the core foam sheet, and portions of the bottom surface of the third foam sheet adhere to portions of the lower surface of the core foam sheet.

9. The method of claim 8, wherein the first and second stiffening layers are formed from openmesh netting.

10. A method of preventing contamination of the surfaces of a pair of compression rollers when first and second stiffening layers and a core foam sheet are compressed between the pair of compression rollers, comprising:

applying an adhesive coating directly to an upper surface of the core foam sheet;

applying an adhesive coating directly to a lower surface of the core foam sheet;

passing the core foam sheet coated with adhesive and the first and second stiffening layers between the pair of compression rollers with a first surface of the first stiffening layer adjacent to the adhesive coating that is on the upper surface of the core foam sheet, and with a first surface of the second stiffening layer adjacent to the adhesive coating that is on the lower surface of the core foam sheet;

placing a second foam sheet having a top surface and a bottom surface between one of the compression rollers and a second surface of the first stiffening layer;

placing a third foam sheet having a top surface and a bottom surface between the other compression roller and a second surface of the second stiffening layer;

so that when the core foam sheet coated with adhesive on its upper and lower surfaces, the first stiffening layer, the second stiffening layer, the second foam sheet, and the third foam sheet pass between the pair of compression rollers, no adhesive contacts the surfaces of the compression rollers and after the first and second stiffening layers and core foam sheet emerge from between the compression rollers, the second foam sheet is separated from the first stiffening layer and core foam sheet.

11. A method of preventing contamination of the surfaces of a pair of compression rollers when first and second stiffening layers and a core foam sheet are compressed between the pair of compression rollers, comprising:

applying an adhesive coating directly to an upper surface of the core foam sheet;

applying an adhesive coating directly to a lower surface of the core foam sheet;

passing the core foam sheet coated with adhesive and the first and second stiffening layers between the pair of compression rollers with a first surface of the first stiffening layer adjacent to the adhesive coating that is on the upper surface of the core foam sheet, and with a first surface of the second stiffening layer adjacent to the adhesive coating that is on the lower surface of the core foam sheet;

placing a second foam sheet having a top surface and a bottom surface between one of the compression rollers and a second surface of the first stiffening layer;

placing a third foam sheet having a top surface and a bottom surface between the other compression roller and a second surface of the second stiffening layer;

so that when the core foam sheet coated with adhesive on its upper and lower surfaces, the first stiffening layer, the second stiffening layer, the second foam sheet, and the third foam sheet pass between the pair of compression rollers, no adhesive contacts the surfaces of the compression rollers and after the first and second stiffening layers and core foam sheet emerge from between the compression rollers, the third foam sheet is separated from the first stiffening layer and core foam sheet.

12. A method of preventing contamination of the surfaces of a pair of compression rollers when first and second stiffening layers and a core foam sheet are compressed between the pair of compression rollers, comprising:

placing a hot melt film adhesive on or adjacent to an upper surface of the core foam sheet;

placing a hot melt film adhesive on or adjacent to a lower surface of the core foam sheet;

placing a first surface of the first stiffening layer adjacent to the hot melt film adhesive that is on or adjacent to the upper surface of the core foam sheet;

placing a first surface of the second stiffening layer adjacent to the hot melt film adhesive that is on or adjacent to the lower surface of the core foam sheet;

passing the core foam sheet, the hot melt adhesive films, and the stiffening layers between the pair of compression rollers;

placing a second foam sheet having a top surface and a bottom surface between one of the compression rollers and a second surface of the first stiffening layer;

placing a third foam sheet having a top surface and a bottom surface between the other compression roller and a second surface of the second stiffening layer; and applying heat to activate the hot melt film adhesive while the sheets, stiffening layers and adhesive films are between the rollers so that when the core foam sheet, the adhesive, the stiffening layers and the second and third foam sheets pass between the pair of compression rollers, no adhesive contacts the surfaces of the compression rollers, and after the first and second stiffening layers and core foam sheet emerge from between the compression rollers, the second foam sheet is separated from the first stiffening layer and core foam sheet.

13. A method of preventing contamination of the surfaces of a pair of compression rollers when first and second stiffening layers and a core foam sheet are compressed between the pair of compression rollers, comprising:

placing a hot melt film adhesive on or adjacent to an upper surface of the core foam sheet;

placing a hot melt film adhesive on or adjacent to a lower surface of the core foam sheet;

placing a first surface of the first stiffening layer adjacent to the hot melt film adhesive that is on or adjacent to the upper surface of the core foam sheet;

placing a first surface of the second stiffening layer adjacent to the hot melt film adhesive that is on or adjacent to the lower surface of the core foam sheet;

passing the core foam sheet, the hot melt adhesive films, and the stiffening layers between the pair of compression rollers;

placing a second foam sheet having a top surface and a bottom surface between one of the compression rollers and a second surface of the first stiffening layer;

placing a third foam sheet having a top surface and a bottom surface between the other compression roller and a second surface of the second stiffening layer; and applying heat to activate the hot melt film adhesive while the sheets, stiffening layers and adhesive films are between the rollers so that when the core foam sheet, the adhesive, the stiffening layers and the second and third foam sheets pass between the pair of compression rollers, no adhesive contacts the surfaces of the compression rollers, and after the first and second stiffening layers and core foam sheet emerge from between the compression rollers, the third foam sheet is separated from the second stiffening layer and core foam sheet.

14. A method of preventing contamination of the surfaces of compression rollers when first and second stiffening layers and a core foam sheet are compressed between a pair of compression rollers, comprising:

depolymerizing an upper surface of the core foam sheet;

depolymerizing a lower surface of the core foam sheet;

passing the core foam sheet with depolymerized upper and lower surfaces and the first and second stiffening layers between the pair of compression rollers with a first surface of the first stiffening layer adjacent to the depolymerized upper surface of the core foam sheet, and with a first surface of the second stiffening layer adjacent to the depolymerized lower surface of the core foam sheet;

placing a second foam sheet having a top surface and a bottom surface between one of the compression rollers and a second surface of the first stiffening layer, and placing a third foam sheet having a top surface and a bottom surface between the other compression roller and a second surface of the second stiffening layer so that when the core foam sheet, the first and second stiffening layers and the second and third foam sheets pass between the compression rollers, the first surface of the first stiffening layer adheres to the upper surface of the core foam sheet, and the first surface of the second stiffening layer adheres to the lower surface of the core foam sheet, and after the first and second stiffening layers and core foam sheet emerge from between the compression rollers, the second foam sheet is separated from the first stiffening layer and core foam sheet.

15. A method of preventing contamination of the surfaces of compression rollers when first and second stiffening layers and a core foam sheet are compressed between a pair of compression rollers, comprising:

depolymerizing an upper surface of the core foam sheet, depolymerizing a lower surface of the core foam sheet, passing the core foam sheet with depolymerized upper and lower surfaces and the first and second stiffening layers between the pair of compression rollers with a first surface of the first stiffening layer adjacent to the depolymerized upper surface of the core foam sheet, and with a first surface of the second stiffening layer adjacent to the depolymerized lower surface of the core foam sheet;

placing a second foam sheet having a top surface and a bottom surface between one of the compression rollers and a second surface of the first stiffening layer, and placing a third foam sheet having a top surface and a bottom surface between the other compression roller and a surface of the second stiffening layer so that when the core foam sheet, the first and second stiffening layers and the second and third foam sheets pass between the compression rollers, the first surface of the first stiffening layer adheres to the upper surface of the core foam sheet, and the first surface of the second stiffening layer adheres to the lower surface of the core foam sheet, and after the first and second stiffening layers and core foam sheet emerge from between the compression rollers, the third foam sheet is separated from the first stiffening layer and core foam sheet.

* * * * *